| (12) | United States Patent | (10) Patent No.: US 9,694,454 B2 |
|---|---|---|
| | Hashiki et al. | (45) Date of Patent: Jul. 4, 2017 |

(54) ELEMENT ARRANGING APPARATUS AND ELEMENT ARRANGING METHOD

(71) Applicant: TOYOTA JIDOSHA KABUSHIKI KAISHA, Toyota-shi, Aichi-ken (JP)

(72) Inventors: Shuichi Hashiki, Miyoshi (JP); Hisao Sembo, Takamatsu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/905,034

(22) PCT Filed: Jul. 10, 2014

(86) PCT No.: PCT/IB2014/001704
§ 371 (c)(1),
(2) Date: Jan. 14, 2016

(87) PCT Pub. No.: WO2015/008146
PCT Pub. Date: Jan. 22, 2015

(65) Prior Publication Data
US 2016/0151866 A1 Jun. 2, 2016

(30) Foreign Application Priority Data
Jul. 17, 2013 (JP) .................................. 2013-148868

(51) Int. Cl.
*B23P 19/00* (2006.01)
*B65G 57/03* (2006.01)
*F16G 5/16* (2006.01)

(52) U.S. Cl.
CPC ........... *B23P 19/002* (2013.01); *B23P 19/001* (2013.01); *B65G 57/03* (2013.01); *F16G 5/16* (2013.01)

(58) Field of Classification Search
CPC ...... B23P 19/002; B23P 19/001; B65G 57/03; F16G 5/16
(Continued)

(56) References Cited

U.S. PATENT DOCUMENTS 3,532,230 A * 10/1970 Howdle ............. B65H 31/3081
198/374
5,669,754 A * 9/1997 Croteau ................. B65H 15/00
198/405

(Continued)

FOREIGN PATENT DOCUMENTS

| JP | 2005042803 A | * | 2/2005 |
| JP | 2006-064070 A | | 3/2006 |

(Continued)

*Primary Examiner* — Jeanette E Chapman
(74) *Attorney, Agent, or Firm* — Oliff PLC

(57) ABSTRACT

An element arranging apparatus includes a supply portion a feed portion, a first holding portion, and a second holding portion. The supply portion includes a first lane and a second lane. First CVT elements and second CVT elements are respectively arranged in the first lane and the second lane in a width direction of the CVT elements. A thickness of the first CVT elements is different from that of the second CVT elements. The feed portion simultaneously feeds one of the first CVT elements and one of the second CVT elements. The CVT elements fed by the feed portion and arranged in a thickness direction of the CVT elements constitute a CVT element set. The first holding portion holds and delivers the CVT element set. The second holding portion sequentially stacks the delivered CVT element sets in the thickness direction, and hold the stacked CVT element sets.

9 Claims, 10 Drawing Sheets

(58) Field of Classification Search
USPC ............ 414/788, 788.1, 788.2, 788.3, 791.3
See application file for complete search history.

(56) References Cited

U.S. PATENT DOCUMENTS

| | | | | |
|---|---|---|---|---|
| 6,746,202 | B2 * | 6/2004 | Mader ................... | B65H 33/12 |
| | | | | 271/186 |
| 8,065,032 | B2 * | 11/2011 | Stifter ..................... | B65B 5/12 |
| | | | | 345/440 |
| 8,423,178 | B2 * | 4/2013 | Baumann ............. | B65G 1/1378 |
| | | | | 414/270 |
| 8,485,774 | B2 * | 7/2013 | Risch ................... | H01L 31/188 |
| | | | | 136/290 |
| 8,834,779 | B2 * | 9/2014 | Hahn ..................... | B65B 5/105 |
| | | | | 264/524 |
| 2006/0135306 | A1 | 6/2006 | Hattori et al. | |
| 2007/0031235 | A1 * | 2/2007 | Nielsen ............... | B65G 57/035 |
| | | | | 414/788.1 |
| 2012/0101628 | A1 * | 4/2012 | Hahn ..................... | B65B 5/12 |
| | | | | 700/224 |

FOREIGN PATENT DOCUMENTS

JP 2006-170393 A 6/2006
JP 2010-070303 A 4/2010

\* cited by examiner

ELEMENT ARRANGING APPARATUS AND ELEMENT ARRANGING METHOD

BACKGROUND OF THE INVENTION

1. Field of the Invention

The invention relates to an element arranging apparatus that arranges Continuously Variable Transmission (CVT) elements, and an element arranging method.

2. Description of Related Art

A belt-type continuously variable transmission (CVT) is typically used in a power transmitting apparatus of a vehicle or the like. The belt used for this continuously variable transmission is made of V-blocks (CVT elements) that are fitted together in a continuous fashion to form an endless body. The belt for the continuously variable transmission is assembled by stacking a plurality of these CVT elements together. Furthermore, one known belt for the continuously variable transmission is configured by combining a plurality of CVT elements of different thicknesses in order to reduce noise, for example (see Japanese Patent Application Publication No. 2006-170393 (JP 2006-170393 A).

However, when a plurality of CVT elements of different thicknesses are combined and arranged in a desired order as described above, assembly man-hours may increase.

SUMMARY OF THE INVENTION

The invention thus provides an element arranging apparatus and an element arranging method that improve assembly efficiency by automatically arranging CVT elements of different thicknesses in a desired order.

A first aspect of the invention relates to an element arranging apparatus that includes a supply portion, a feed portion, a first holding portion, and a second holding portion. The supply portion includes a first lane and a second lane. A plurality of CVT elements are arranged in a continuous manner in a width direction of the CVT elements in the first lane. A plurality of CVT elements having a different thickness from a thickness of the CVT elements of the first lane are arranged in a continuous manner in the width direction in the second lane. The second lane is arranged parallel to the first lane. The feed portion is configured to simultaneously feed one of the CVT elements of the first lane and one of the CVT elements of the second lane. The CVT elements fed by the feed portion and arranged in a thickness direction of the CVT elements constitute a CVT element set. The first holding portion is configured to hold the CVT element set and deliver the held CVT element set. The second holding portion is configured to sequentially stack a plurality of the CVT element sets delivered by the first holding portion in the thickness direction, and hold the stacked plurality of CVT element sets.

In the first aspect described above, the feed portion may include a feed mechanism and a cam mechanism. The feed mechanism has a link provided for each of the first lane and the second lane. The link of the first lane is configured to hold a leading CVT element of the first lane, and the link of the second lane is configured to hold a leading CVT element of the second lane. The cam mechanism has cams respectively corresponding to the first lane and the second lane. The feed portion is configured to drop the leading CVT elements with respect to the first holding portion by the links that are driven by the cams rotating. An arrangement switching portion is attached to each of the links. Each of the arrangement switching portions is configured to switch a state of the corresponding link to one of a connected state that drops the CVT element of the corresponding lane as a corresponding one of the cams rotates, and a disconnected state in which the rotation of the corresponding one of the cams is not transmitted to the corresponding link. Also, in this first aspect, the first holding portion may have a supporting portion and a transporting pawl portion. The supporting portion is configured to support the CVT element set. The transporting pawl portion is configured to deliver the CVT element set supported by the supporting portion toward the second holding portion. The cam mechanism may have a rotating shaft connected to the cams. Also, the transporting pawl portion of the first holding portion may be connected to the rotating shaft and configured to operate in conjunction with the cams. In this first aspect, the element arranging apparatus may also include a first driving portion, a second driving portion, and a control portion. The first driving portion is configured to drive the arrangement switching portion. The second driving portion is configured to simultaneously drive the cams and the transporting pawl portion. The control portion is configured to control the first driving portion and the second driving portion.

In the first aspect described above, the cam mechanism may be provided independently for each of the first lane and the second lane. Each link may include a first link, a second link, and a third link. The first link abuts against the corresponding one of the cams. The second link is connected to the first link. The third link is connected to the second link and is configured to hold and drop the CVT element. Further, the arrangement switching portion may be configured to switch the state of the first link to one of the connected state and the disconnected state, by switching the state of the first link between the connected state and the disconnected state.

In the first aspect described above, the element arranging apparatus may also include a first moving portion and a second moving portion. The first moving portion is provided for each of the first lane and the second lane, and is configured to push the CVT element toward the feed portion. The second moving portion is configured to push the CVT element set held by the first holding portion, in a unified manner. Also, in the first aspect described above, the element arranging apparatus may also include a third moving portion. The third moving portion is configured to deliver the CVT element set held by the first holding portion toward the second holding portion.

In the first aspect described above, a terminal end portion of the second holding portion may have an arc shape. Also, the CVT element set may be stacked along the terminal end portion.

A second aspect of the invention relates to an element arranging method that includes arranging a plurality of CVT elements in a continuous manner in a width direction of the CVT elements, in each of a first lane and a second lane; making a thickness of the CVT elements of the first lane different from a thickness of the CVT elements of the second lane; simultaneously feeding one of the CVT elements of the first lane and one of the CVT elements of the second lane; holding a CVT element set constituted by the CVT elements fed and arranged in a thickness direction of the CVT elements; delivering the held CVT element set; and sequentially stacking a plurality of the delivered CVT element sets in the thickness direction and holding the stacked CVT element sets.

The aspects of the invention make it possible to provide an element arranging apparatus, and an element arranging method, that improves assembly efficiency by automatically arranging CVT elements of different thicknesses in a desired order.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
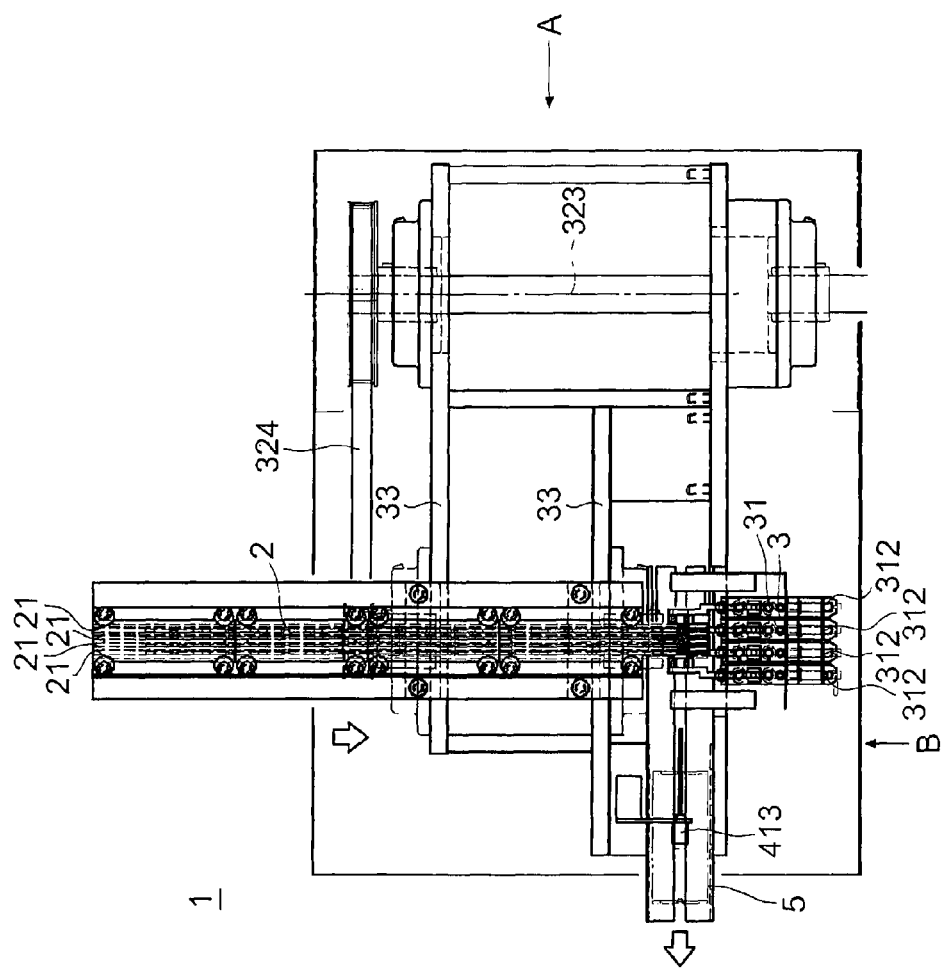
FIG. 1 is a plan view of an element arranging apparatus according to one example embodiment of the invention, viewed from above.
Figure 2:
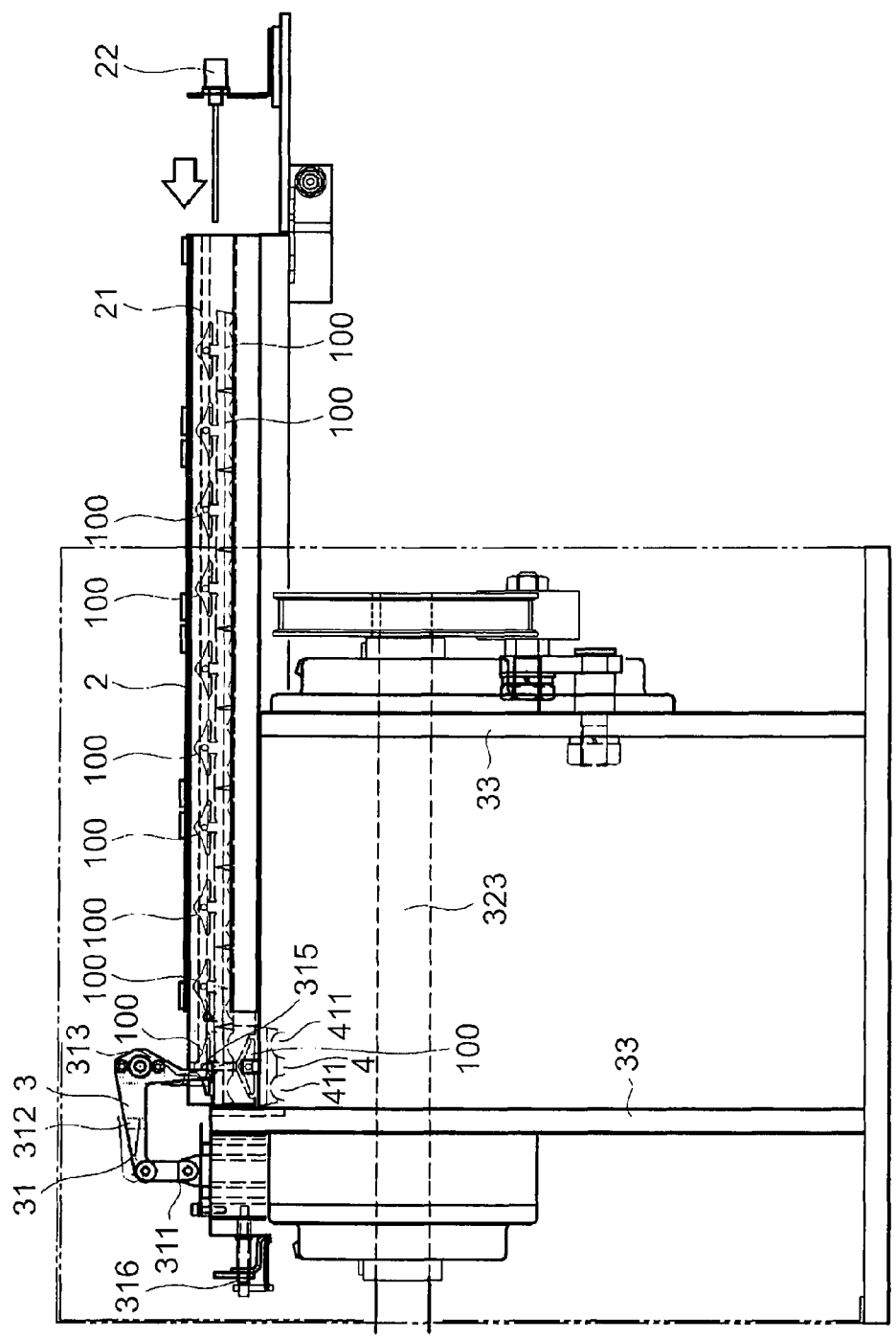
FIG. 2 is a side view of the element arranging apparatus shown in FIG. 1, viewed from direction A.
Figure 3:
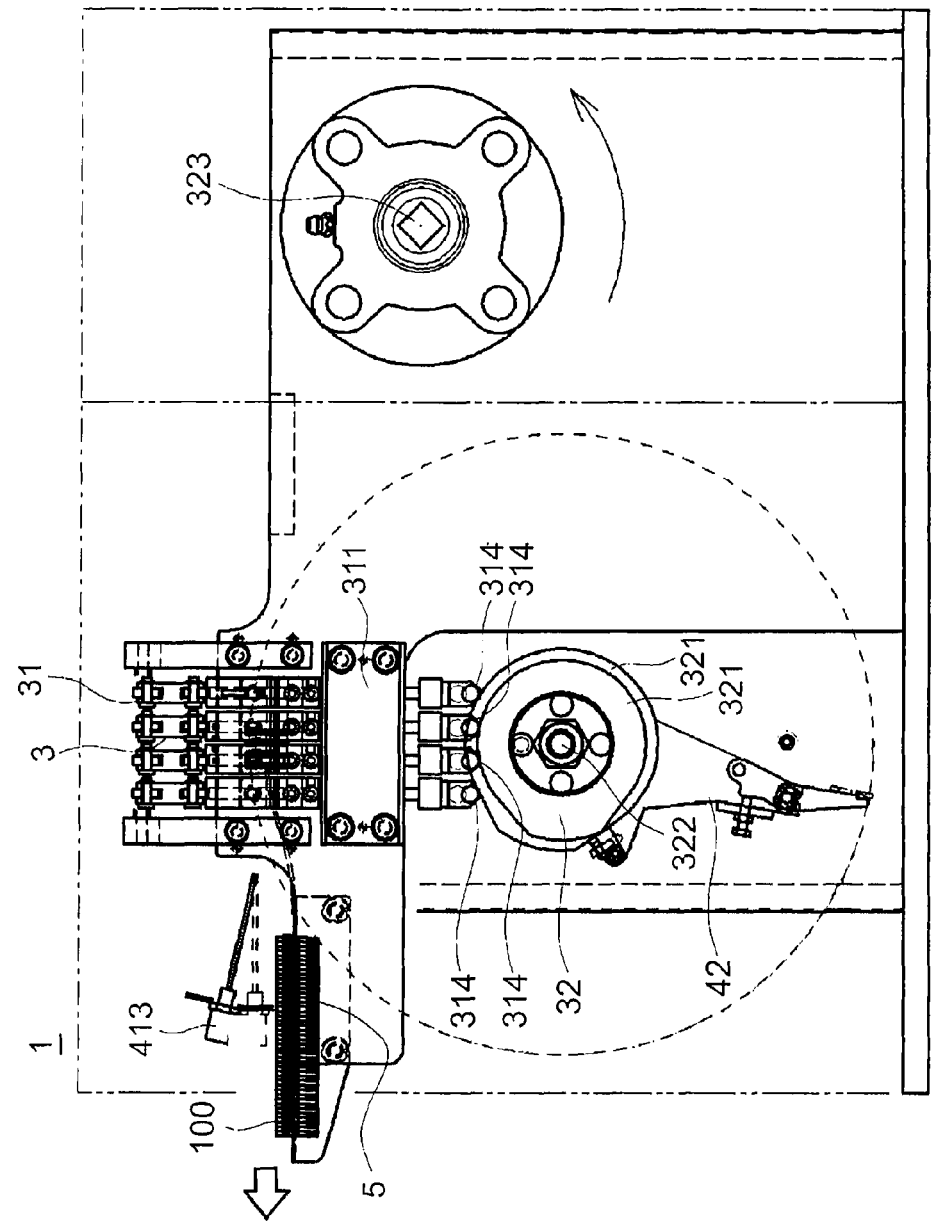
FIG. 3 is a side view of the element apparatus shown in FIG. 1, viewed from direction B.

Hereinafter, example embodiments of the invention will be described with reference to the accompanying drawings. FIG. 1 is a plan view of an element arranging apparatus according to one example embodiment of the invention, viewed from above. FIG. 2 is a side view of the element arranging apparatus shown in FIG. 1, viewed from direction A. FIG. 3 is a side view of the element apparatus shown in FIG. 1, viewed from direction B.

An element arranging apparatus 1 according to one example embodiment of the invention is configured to arrange a plurality of CVT elements 100 of different thicknesses in a desired order. Here, a CVT belt produces contact noise when the CVT elements 100 contact a pulley. If the CVT elements 100 are all the same thickness, the CVT belt will produce an unpleasant noise that has a peak at a predetermined frequency. In contrast, if a plurality of CVT element (block) sets in which the number ratio of CVT elements 100 having different thicknesses is different for each is formed and a CVT belt is assembled with these CVT element sets, noise is dispersed so the peak is able to be reduced further. Therefore, an apparatus capable of efficiently arranging these kinds of CVT elements 100 is needed.

The element arranging apparatus 1 according to this example embodiment is able to automatically and efficiently arrange the CVT elements 100, such that noise is able to be effectively reduced as described above. According to this element arranging apparatus 1, when manufacturing a CVT belt, the CVT elements 100 are able to be easily assembled in a ring while keeping the arranged state of the CVT elements 100, so the assembly man-hours is able to be significantly improved (i.e., reduced).

Figure 4:
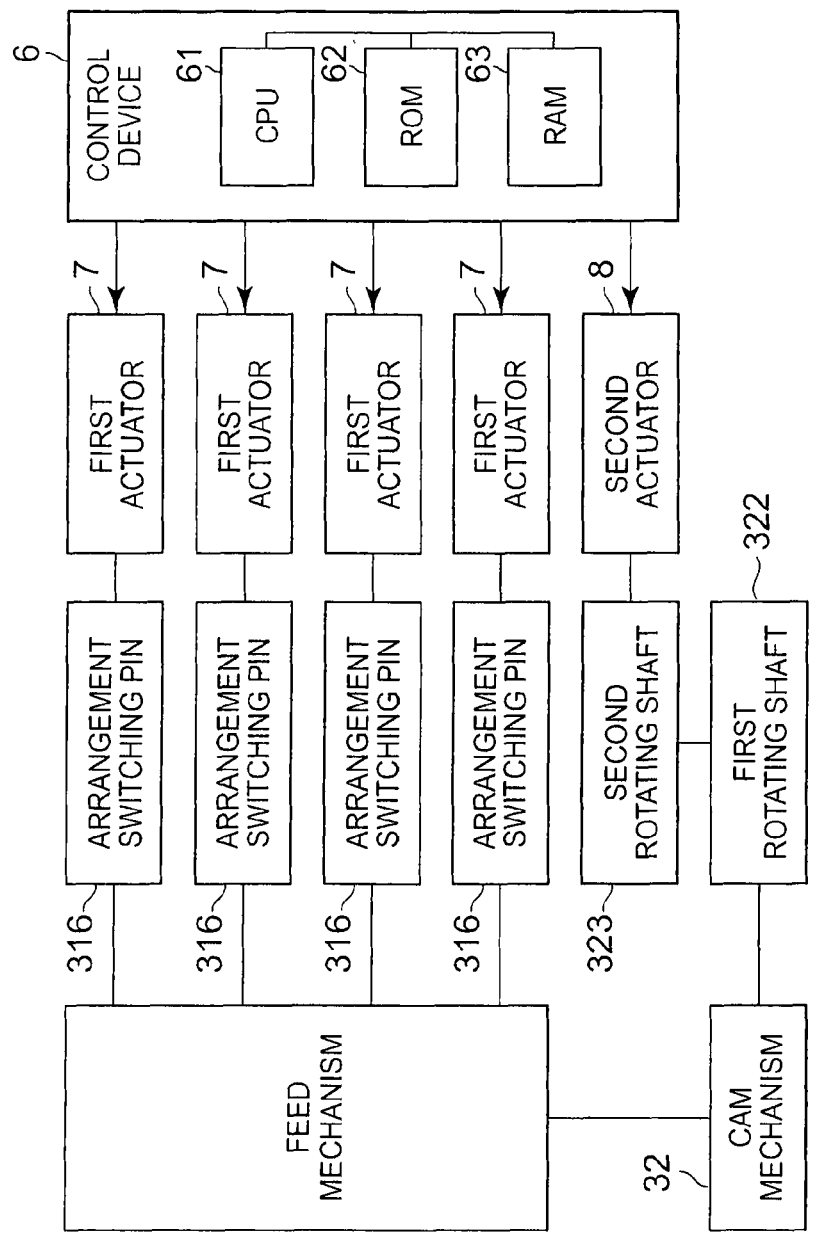
FIG. 4 is a block diagram of the general system configuration of the element arranging apparatus according to the example embodiment of the invention.

FIG. 4 is a block diagram of the general system configuration of the element arranging apparatus according to this example embodiment. The element arranging apparatus 1 according to this example embodiment includes a supply portion 2, a feed portion 3, a first holding portion 4, a second holding portion 5, and a control device 6. The supply portion 2 is constituted by a plurality of parallel lanes 21. The feed portion 3 is configured to feed the CVT elements 100 one by one from each lane 21 of the supply portion 2. The first holding portion 4 is configured to hold a set of CVT elements (also referred to as a "CVT element set") constituted by the plurality of the CVT elements 100 that have been fed by the feed portion 3 and arranged. The second holding portion 5 is configured to sequentially stack and hold a plurality of the delivered CVT element sets. The control device 6 is configured to control the feed portion 3.

The supply portion 2 may be regarded as one specific example of a supply portion of the invention. In this example embodiment, the supply portion 2 is constituted by four lanes 21 that are parallel to each other, but the invention is not limited to this. For example, the supply portion 2 may also be constituted by two lanes or eight lanes. That is, the number of lanes of the supply portion 2 may be freely changed. The number of lanes is set taking into account the number of CVT belts produced (i.e., the production efficiency) and the thickness and the number of types of CVT elements which have different thicknesses from each other, for example. According to this example embodiment, changes of the number of CVT belts produced and the number of the types of CVT elements are able to be easily and flexibly accommodated simply by increasing or decreasing the number of lanes to match increase or decrease in the number of CVT belts to be produced and the number of the types of CVT elements.

A plurality (e.g., 10) CVT elements 100 are arranged in a continuous manner in a width direction thereof in each of the lanes 21. The thicknesses of the CVT elements 100 are different for each of the lanes 21. For example, thick CVT elements 100 may be arranged in first and second lanes 21, and thin CVT elements 100 may be arranged in third and fourth lanes 21. Alternatively, thick CVT elements 100 may be arranged in the first and third lanes 21 and thin CVT elements 100 may be arranged in the second and fourth lanes 21. Any suitable combination may be applied. The combination of thicknesses of the CVT elements 100 arranged in the lanes 21 may be changed as appropriate according to the configuration method of the CVT element set designed to reduce noise as described above, for example. Moreover, CVT elements 100 of three or more different thicknesses may also be arranged in the lanes 21. In this way, the frequency characteristic of the noise generated by the CVT belt is able to be easily and flexibly accommodated simply by easily changing the thickness of the CVT elements 100 in the lanes 21.

Figure 5:
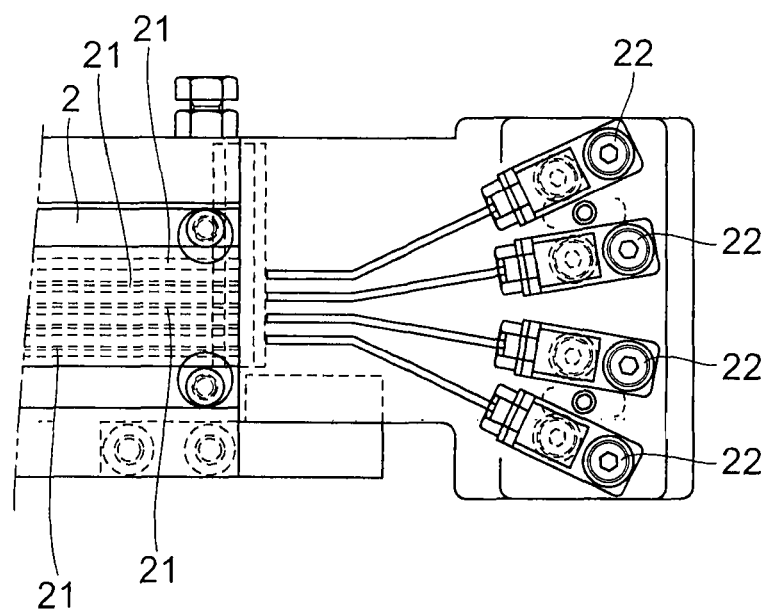
FIG. 5 is a view of a first supply blower provided for each lane of a supply portion according to the example embodiment of the invention.

A first supply blower 22 is provided on one end of each of the lanes 21 (FIG. 5). Each first supply blower 22 may be regarded as a specific example of a first moving portion of the invention. The first supply blower 22 pushes a row of CVT elements toward the feed portion 3 side by air pressure, by discharging air toward the row of CVT elements. Compressed air is supplied to each first supply blower 22 from a compressor or the like. Further, the first moving portion is not limited to a device that uses air pressure. That is, a belt conveyor or a vibrating feeder that moves the CVT elements 100 by vibrating them may also be provided for each of the lanes 21. If these are provided at the same time, the CVT elements 100 will be pushed by the air pressure of the first supply blower 22 while being vibrated by the vibrating feeder. As a result, the CVT elements 100 in the lanes 21 are able to be moved smoothly and quickly.

Figure 6:
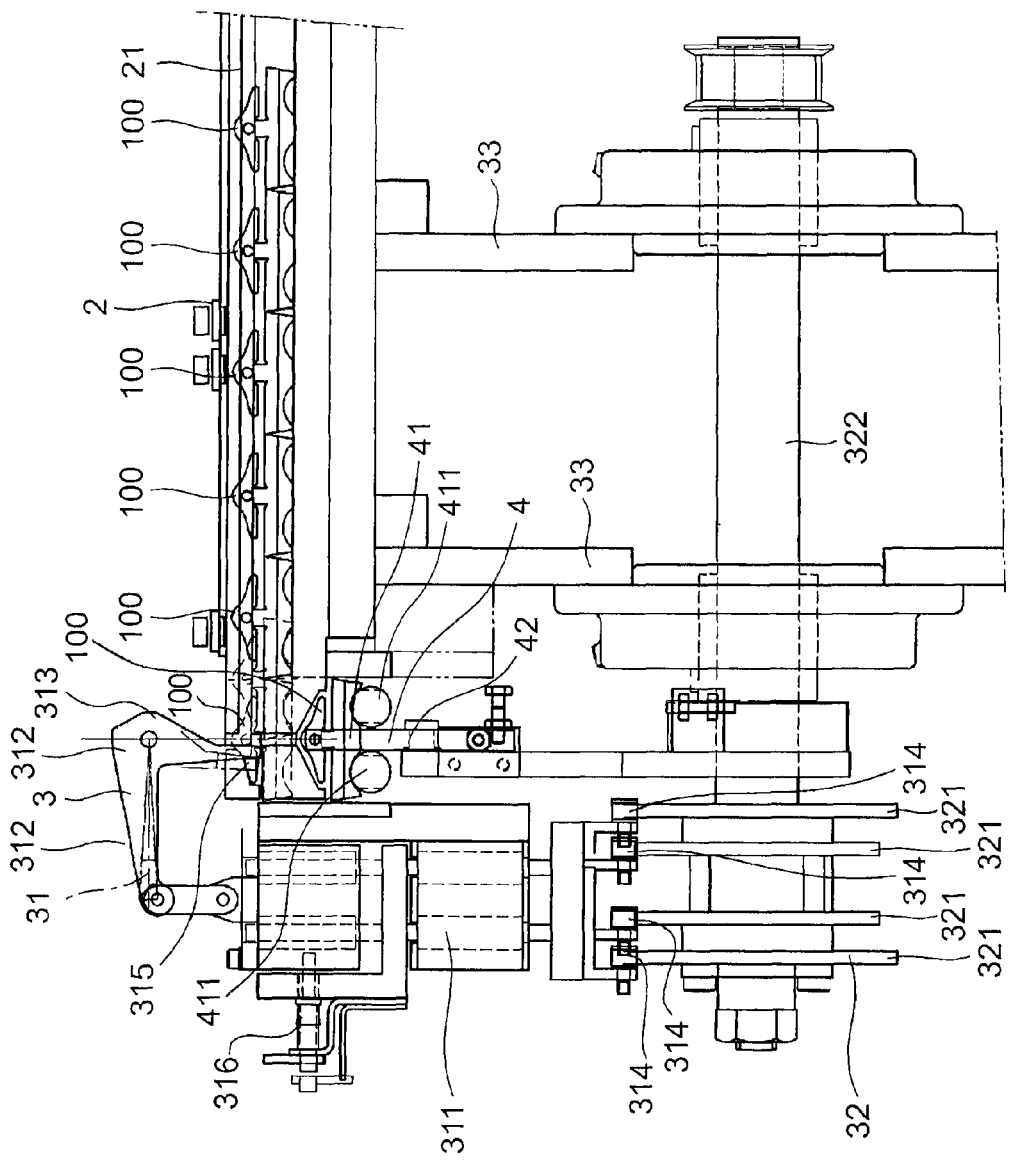
FIG. 6 is a view of the structure of a feed portion according to the example embodiment of the invention.

The feed portion 3 may be regarded as one specific example of a feed portion of the invention. The feed portion 3 feeds the CVT elements 100 one by one from the lanes 21 of the supply portion 2 (FIG. 6). The feed portion 3 includes a feed mechanism 31, and a cam mechanism 32. The feed mechanism 31 has a first link 311, a second link 312, and a third link 313. The first link 311, the second link 312, and the third link 313 are provided independently for each lane 21. The first link 311 extends in a vertical direction and abuts against the cam mechanism 32. The second link 312 extends in a lateral direction and is connected to the first link 311. The third link 313 extends in the vertical direction and is connected to the second link 312. A cam roller 314 is provided on a lower end of the first link 311. The cam roller 314 abuts against an outer edge of a cam 321 of the cam mechanism 32. The first link 311 moves in the vertical direction along the outer edge shape of the cam 321 in response to the cam roller 314 rolling along the outer edge shape of the cam 321. The second link 312 is rotatably supported near its center, and oscillates in the vertical direction centered on its axis. The third link 313 moves in the vertical direction in response to the oscillation of the second link 312. A pawl portion 315 on which a protruding portion of the CVT element 100 positioned at the head of each lane 21 (i.e., in the position closest to the feed portion 3; this CVT element is also referred to as a "leading CVT element") is hung is attached to a lower end of the third link 313. That is, the CVT element 100 positioned at the head is held by the pawl portion 315 that is attached to the lower end of the third link 313. The head CVT element 100 drops to the first holding portion 4 from the pawl portion 315 on the lower end of the third link 313 by the third link 313 inclining slightly as it moves downward. As a result, the head CVT elements 100 are fed one by one from the CVT element rows in the lanes 21.

An arrangement switching pin 316 is attached to each first link 311. The arrangement switching pin 316 may be regarded as a specific example of an arrangement switching portion of the invention. The arrangement switching pins 316 have a function that switches the first links 311 individually between a connected state and a disconnected state. A first actuator 7 such as a linear solenoid is provided on each arrangement switching pin 316. Each first actuator 7 may be regarded as a specific example of a first driving portion of the invention. Each first actuator 7 switches the corresponding first link 311 between the connected state and the disconnected state, by switching the corresponding arrangement switching pin 316 in response to a control signal from the control device 6.

When the first link 311 is in the connected state, the first link 311 moves in the vertical direction with the rotation of the cam 321 of the cam mechanism 32, and the second and third links 312 and 313 also move in conjunction with this movement. Therefore, only the CVT element 100 of the lane 21 corresponding to the link in this connected state is fed. On the other hand, when the first link 311 is in the disconnected state, even if the cam 321 of the cam mechanism 32 rotates, the vertical movement of the first link 311 will not be transmitted to the second and third links 312 and 313. Therefore, the CVT element 100 of the lane 21 corresponding to the link that is in the disconnected state will not be fed. As described above, the lane 21 that feeds the CVT element 100 is set by switching the first links 311 between the connected state and the disconnected state using the arrangement switching pins 316, so the arrangement pattern of the CVT elements 100 is able to be set easily.

The cam mechanism 32 includes a first rotating shaft 322 and four cams 321. The first rotating shaft 322 is rotatably supported by a supporting member 33. The four cams 321 are connected to the first rotating shaft 322, with each of the four cams 321 corresponding to a different lane 21. When the first rotating shaft 322 rotates, the cams 321 also rotate in the same direction. Each of the cams 321 is a generally disc-shaped member, and has a protruding portion in which a portion thereof protrudes in the radial direction. The protruding portion of each cam 321 is positioned and is connected to the first rotating shaft 322 so that the pawl portions 315 of the third links 313 of the feed mechanism 31 cause the CVT elements 100 of the lanes 21 to drop down simultaneously.

A second rotating shaft 323 is rotatably supported substantially parallel to the first rotating shaft 322, by the supporting member 33. A drive shaft of a second actuator 8 such as an electric motor is connected to the second rotating shaft 323. The second actuator 8 may be regarded as a specific example of a second driving portion of the invention. The second actuator 8 rotates in response to a control signal from the control device 6, and rotatably drives the second rotating shaft 323. The first rotating shaft 322 and the second rotating shaft 323 are connected by a timing belt, for example.

Figure 7:
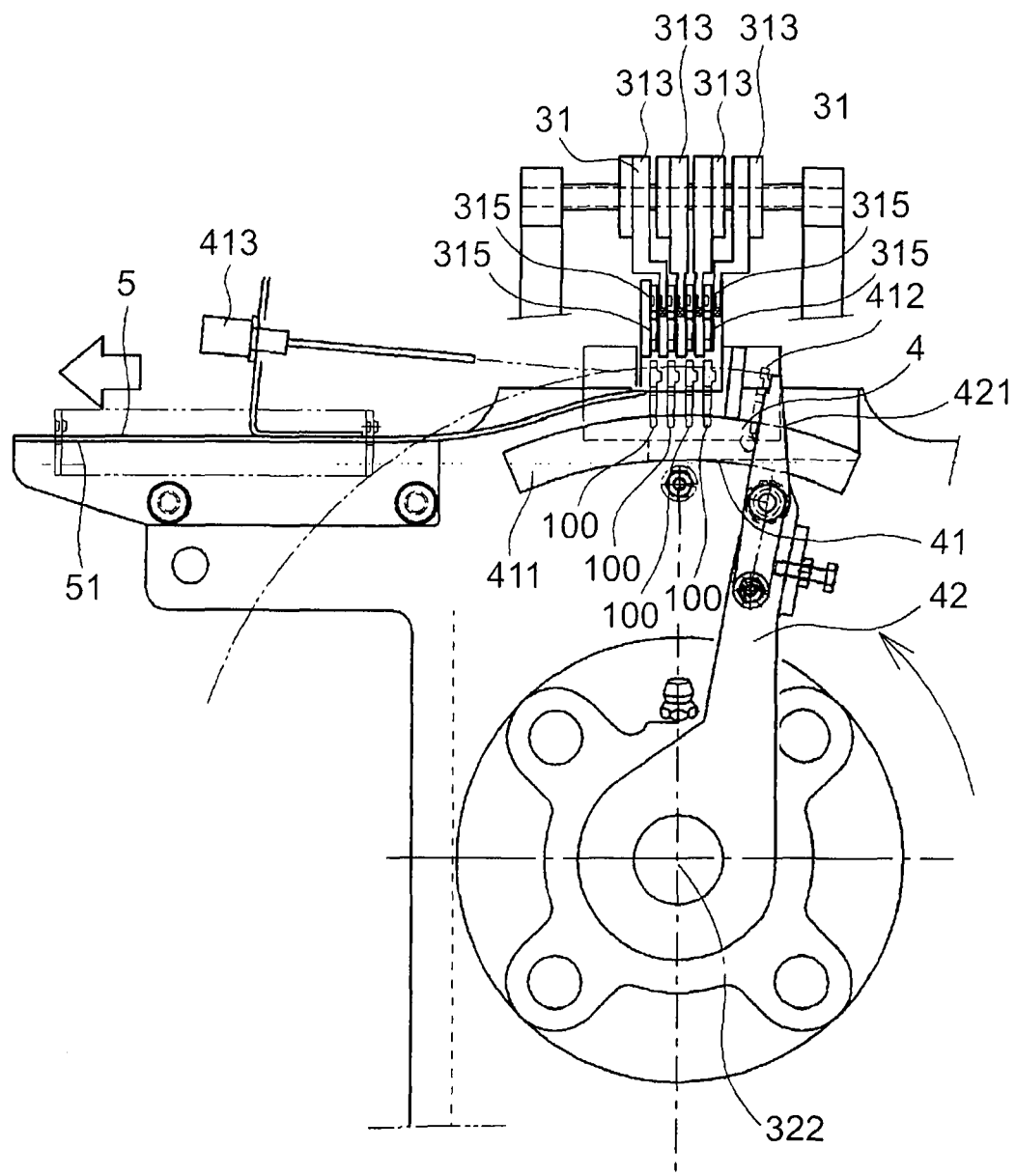
FIG. 7 is a view of the structure of a first holding portion and a second holding portion according to the example embodiment of the invention.

The first holding portion 4 may be regarded as a specific example of a first holding portion of the invention. The first holding portion 4 holds a CVT element set that is made up of a plurality (e.g., two or four) of CVT elements 100 that have been fed from the lanes 21 of the supply portion 2 by the feed portion 3 (FIG. 7). The first holding portion 4 arranges the CVT elements 100 that have been dropped down by the pawl portion 315 of the third link 313 of the feed portion 3 from the lanes 21 of the supply portion 2, in the thickness direction and holds them.

The first holding portion 4 has a supporting portion 41 and a transporting pawl portion 42. The supporting portion 41 is configured to support the set of CVT elements fed from the lanes 21 of the supply portion 2 by the feed portion 3. The transporting pawl portion 42 is configured to deliver the set of CVT elements supported by the supporting portion 41 to the second holding portion 5 side.

The supporting portion 41 has a pair of supporting members 411, a supporting plate 412, and a second supply blower 413. The pair of supporting members 411 has a general arc shape in the same direction as an arc shape of the cams 321 of the cam mechanism 32 (i.e., the thickness direction of the CVT elements 100), and supports the lower end of the set of CVT elements. The supporting plate 412 is provided on the supporting members 411 and supports the CVT elements 100 in the thickness direction. The second supply blower 413 is configured to push the CVT element set toward the supporting plate 412 side by air pressure. That is, the second supply blower 413 is configured to push the CVT element set in a unified manner. The second supply blower 413 may be regarded as a specific example of a second moving portion of the invention. The supporting portion 41 has a general arc shape, but the invention is not limited to this. For example, the supporting portion 41 may also have a linear shape. Also, the CVT element set is pushed toward the supporting plate 412 by air pressure, but the invention is not limited to this. That is, the CVT elements 100 may also fall under the weight of the CVT element set itself, and push each other.

The lower end of the transporting pawl portion 42 is connected to the first rotating shaft 322 and rotates in conjunction with the cams 321 of the cam mechanism 32. A delivery pawl portion 421 is provided on an upper end of the transporting pawl portion 42. This delivery pawl portion 421 rotates with the rotation of the first rotating shaft 322, passes between the pair of supporting members 411, and delivers the CVT element set to the second holding portion 5 side. The angle of the delivery pawl portion 421 in the rotational direction is able to be adjusted, so the posture angle when the CVT element set is pushed out is able to be adjusted.

Here, the rotation of the transporting pawl portion 42 and the rotation of the cams 321 of the cam mechanism 32 are operatively linked by the first rotating shaft 322. That is, the transporting pawl portion 42 and the cams 321 are connected to the first rotating shaft 322 such that the CVT element set held by the first holding portion 4 is delivered by the transporting pawl portion 42 after a slight pause after the CVT elements 100 are fed from the lanes 21 to the first holding portion 4 by the rotation of the cams 321 and held by the first holding portion 4. In this way, the transporting pawl portion 42 and the cams 321 are able to be driven simultaneously using a single actuator, so the number of actuators are able to be reduced, which in turn enables costs to be reduced.

The second holding portion 5 may be regarded as a specific example of a second holding portion of the invention. The second holding portion 5 stacks a plurality of CVT element sets that have been held by the first holding portion 4 and fed, in the thickness direction and holds them. In this way, the CVT elements 100 that have been arranged in the width direction in the lanes 21 of the supply portion 2 and fed are able to be arranged in the thickness direction in the first holding portion 4, and then the CVT element set can be stacked in the thickness direction in the second holding portion 5. Therefore, the apparatus takes up less space, so the size and cost of the element arranging apparatus 1 are able to be reduced.

A vibrating feeder or a third supply blower that pushes the CVT element set, which has been delivered from the first holding portion 4, by air pressure in the moving direction of the CVT element set may also be provided in the second holding portion 5. As a result, the CVT element set is able to be more smoothly and quickly stacked in the thickness direction. The third supply blower and the vibrating feeder may be regarded as a specific example of a third moving portion of the invention.

The second holding portion 5 has a pair of plate-like members 51 that are connected to the first holding portion 4 and extend parallel in the thickness direction of the CVT elements 100. The plate-like members 51 are fit into slots in neck portions of the CVT elements 100, and the CVT elements 100 are held hanging downward. The second holding portion 5 may also be constituted by a guide member that extends in the thickness direction of the CVT elements 100 and guides the outer shape of the CVT elements 100.

A terminal end portion of the second holding portion 5 may have an arc shape. As a result, the CVT elements 100 are held in the posture in which they will be when a ring is assembled, thus facilitating assembly of the CVT belt.

The control device 6 may be regarded as a specific example of a control portion of the invention. The control device 6 controls the second actuator 8 that rotatably drives the second rotating shaft 323, and the first actuator 7 that drives the arrangement switching pin 316. The control device 6 controls the rotation speed of the second actuator 8, as well as controls the rotation speeds of the first and second rotating shafts 322 and 323, according to a user setting. As a result, the speed at which the CVT elements 100 are fed from the lanes 21 of the supply portion 2, and the speed at which the CVT element set at the first holding portion 4 is delivered to the second holding portion 5, are able to be appropriately and easily regulated.

At the same time, the switching of the arrangement switching pins 316 is controlled by controlling the first actuators 7 according to a user setting. As a result, the lanes 21 that feed the CVT elements 100 are able to be set, so the arrangement pattern of the CVT elements 100 is able to be appropriately and easily set.

The control device 6 is constituted by, for example, hardware centered around a microcomputer that includes a Central Processing Unit (CPU) 61 that performs control processing and calculations and the like, Read Only Memory (ROM) 62 within which control programs and calculation programs executed by the CPU 61 are stored, and Random Access Memory (RAM) 63 that temporarily stores processing data and the like. The CPU 61, the ROM 62, and the RAM 63 are connected together by a data bus 64 or the like.

Next, an element arranging method according to the example embodiment will be described in detail. CVT elements 100 of different thicknesses are arranged in a continuous manner in the width direction in the lanes 21 of the supply portion 2 (step S101).

The control device 6 controls the second actuator 8 to rotate the first and second rotating shafts 322 and 323, such that the cams 321 of the cam mechanism 32 of the feed portion 3 rotates. At the same time, the control device 6 controls the switching of the arrangement switching pins 316 to switch between the connected state and the disconnected state of the first link 311 of the feed mechanism 31, by controlling the first actuators 7 according to the set arrangement pattern of the CVT elements 100 (step S102).

The first, second, and third links 311, 312, and 313 move in response to the rotation of the cams 321 of the cam mechanism 32 of the feed portion 3, and the CVT elements 100 of the lanes 21 corresponding to the links that are in the connected state are fed to the first holding portion 4 (step S103).

The CVT elements 100 from the lanes 21 that are fed by the feed portion 3 are held by the supporting portion 41 of the first holding portion 4 (step S104).

Further, the transporting pawl portion 42 of the first holding portion 4 rotates with the rotation of the first rotating shaft 322, such that the CVT element set held by the supporting portion 41 is delivered to the second holding portion 5 (step S105).

The second holding portion 5 sequentially stacks and holds a plurality of CVT element sets delivered from the first holding portion 4 (step S106).

Just as described above, the element arranging apparatus 1 according to this example embodiment includes the supply portion 2, the feed portion 3, the first holding portion 4, and the second holding portion 5. The supply portion 2 includes a plurality of parallel lanes 21 within which a plurality of CVT elements 100 of different thicknesses are arranged in a continuous manner in the width direction. The feed portion 3 is configured to simultaneously feed one of the CVT elements 100 at a time from each of the lanes 21 of the supply portion 2. The first holding portion 4 holds a CVT element set constituted by a plurality of the CVT elements 100 that have been fed by the feed portion 3 and arranged in the thickness direction. The first holding portion 4 is also configured to deliver the held CVT element set. The second holding portion 5 is configured to sequentially stack and hold a plurality of CVT element sets that have been delivered by the first holding portion 4. As a result, the CVT elements 100 having different thicknesses from each other are able to be automatically arranged in a desired order, so assembly efficiency is able to be improved.

Figure 8:
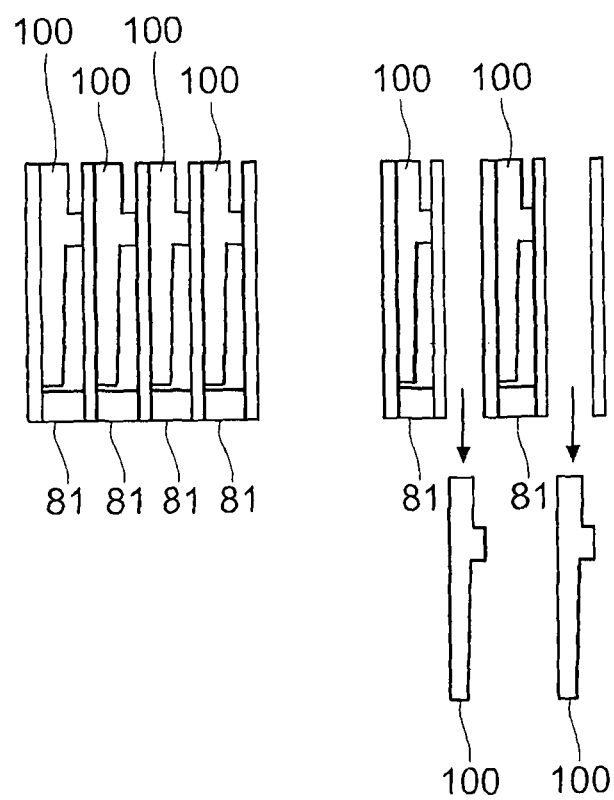
FIG. 8 is a view of the structure of a shutter-type opening and closing portion provided for each lane of the supply portion according to the example embodiment of the invention.
Figure 9:
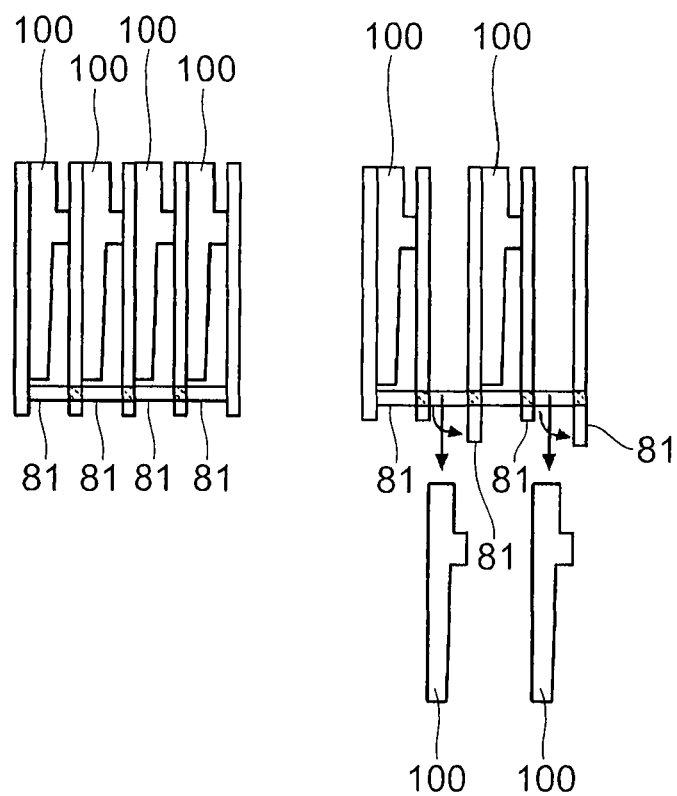
FIG. 9 is a view of a structure in which a door-type opening and closing portion is provided for each lane of the supply portion according to the example embodiment of the invention.
Figure 10:
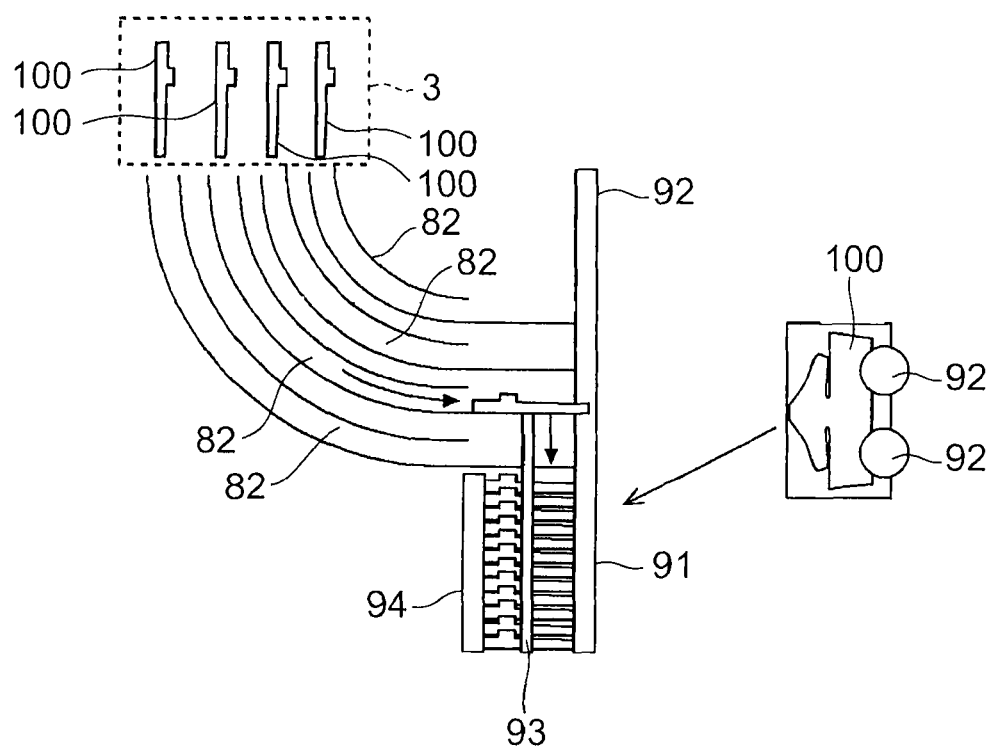
FIG. 10 is a view of a structure that delivers CVT elements to the second holding portion via a transport chute from the feed portion according to the example embodiment of the invention.

The invention is not limited to the example embodiment described above. The structure may be modified as appropriate. In the example embodiment described above, the CVT elements 100 that are hung on the pawl portion 315 are dropped and fed from the lanes 21 of the supply portion 2. However, the example embodiment of the invention is not limited to this structure. For example, a shutter-type opening and closing portion 81 may be provided on a lower surface of each lane 21 (FIG. 8). In this case, the CVT element 100 in each of the lanes 21 may be dropped and fed to the first holding portion 4 by its own weight, by opening the opening and closing portion 81 of each lane 21. Also, the opening and closing portion 81 may be a door-type opening and closing portion (FIG. 9). In the example embodiment described above, the CVT elements 100 are delivered to the second holding portion 5 after being fed from the lanes 21 of the supply portion 2 by the feed portion 3 and then temporarily held by the first holding portion 4. However, the example embodiment of the invention is not limited to this. For example, the CVT elements 100 may be fed from the lanes 21 of the supply portion 2 by the feed portion 3 and delivered to a second holding portion 91 via a transport chute 82 that serves as a passage having an arc shape (FIG. 10). The second holding portion 91 has a stopper guide 92, a pair of neck portion guides 93, and a head portion guide 94. The stopper guide 92 extends in the vertical direction and is configured to stop the CVT elements 100 delivered from the transport chute 82. The pair of neck portion guides 93 extends in the vertical direction and fits into a slot in the neck portion of the CVT elements 100. The head portion guide 94 extends in the vertical direction and is configured to guide the head portion of the CVT elements 100. The CVT elements 100 of the lanes 21 fed by the feed portion 3 pass through the transport chute by their own weight and move to the stopper guide 92 of the second holding portion 91. The CVT elements 100 stopped by the stopper guide 92 fit into the neck portion guides 93, and naturally drop downward along the neck portion guides 93 and the head portion guide 94. As a result, the CVT elements 100 are stacked in a predetermined arrangement pattern.

The invention claimed is:

1. An element arranging apparatus comprising:
   a supply portion that includes a first lane in which a plurality of CVT elements are arranged in a continuous manner in a width direction of the CVT elements, and a second lane that is parallel to the first lane and in which a plurality of CVT elements having a different thickness from a thickness of the CVT elements of the first lane are arranged in a continuous manner in the width direction;
   a feed portion configured to simultaneously feed one of the CVT elements of the first lane and one of the CVT elements of the second lane;
   a first holding portion configured to hold a CVT element set constituted by the CVT elements fed by the feed portion and arranged in a thickness direction of the CVT elements, and delivers the held CVT element set; and
   a second holding portion configured to sequentially stack a plurality of the CVT element sets delivered by the first holding portion in the thickness direction, and hold the stacked plurality of CVT element sets.

2. The element arranging apparatus according to claim 1, wherein
   the feed portion includes a feed mechanism and a cam mechanism;
   the feed mechanism has a link provided for each of the first lane and the second lane;
   the link of the first lane is configured to hold a leading CVT element of the first lane, and the link of the second lane is configured to hold a leading CVT element of the second lane;
   the cam mechanism has cams respectively corresponding to the first lane and the second lane;
   the feed portion is configured to drop the leading CVT elements with respect to the first holding portion by the links that are driven by the cams rotating;
   an arrangement switching portion is attached to each of the links; and
   each of the arrangement switching portions is configured to switch a state of the corresponding link to one of a connected state that drops the CVT element of the corresponding lane as a corresponding one of the cams rotates, and a disconnected state in which the rotation of the corresponding one of the cams is not transmitted to the corresponding link.

3. The element arranging apparatus according to claim 2, wherein
   the first holding portion has a supporting portion and a transporting pawl portion;
   the supporting portion is configured to support the CVT element set;
   the transporting pawl portion is configured to deliver the CVT element set supported by the supporting portion toward the second holding portion;
   the cam mechanism has a rotating shaft connected to the cams; and
   the transporting pawl portion of the first holding portion is connected to the rotating shaft and is configured to operate in conjunction with the cams.

4. The element arranging apparatus according to claim 3, further comprising:
   a first driving portion configured to drive the arrangement switching portion;
   a second driving portion configured to simultaneously drive the cams and the transporting pawl portion; and
   a control portion configured to control the first driving portion and the second driving portion.

5. The element arranging apparatus according to claim 2, wherein
   the cam mechanism is provided independently for each of the first lane and the second lane;
   each link includes a first link, a second link, and a third link;
   the first link abuts against the corresponding one of the cams;
   the second link is connected to the first link;
   the third link is connected to the second link and is configured to hold and drop the CVT element; and
   the arrangement switching portion is configured to switch the state of the first link to one of the connected state and the disconnected state, by switching the state of the first link between the connected state and the disconnected state.

6. The element arranging apparatus according to claim 1, further comprising:
   a first moving portion that is provided for each of the first lane and the second lane, and that is configured to push the CVT element toward the feed portion; and
   a second moving portion configured to push the CVT element set held by the first holding portion, in a unified manner.

7. The element arranging apparatus according to claim 6, further comprising:
   a third moving portion configured to deliver the CVT element set held by the first holding portion toward the second holding portion.

8. The element arranging apparatus according to claim 1, wherein
   a terminal end portion of the second holding portion has an arc shape; and
   the CVT element set is stacked along the terminal end portion.

9. The element arranging apparatus according to claim 1, wherein
   the feed portion includes a feed mechanism and a cam mechanism;
   the feed mechanism has a link provided for each of the first lane and the second lane;
   the link of the first lane is configured to hold a leading CVT element of the first lane, and the link of the second lane is configured to hold a leading CVT element of the second lane;
   the cam mechanism has cams respectively corresponding to the first lane and the second lane;
   the feed portion is configured to drop the leading CVT elements with respect to the first holding portion by the links that are driven by the cams rotating.

\* \* \* \* \*